United States Patent [19]
Sargent et al.

[11] Patent Number: 5,318,275
[45] Date of Patent: Jun. 7, 1994

[54] PORTABLE WASTE HOLDING TANK WITH IMPROVED INLET VALVE ASSEMBLY

[75] Inventors: Charles L. Sargent, Ann Arbor; John A. Hoffman, Brighton; John M. Antos; Kevin B. Chlebek, both of Ann Arbor, all of Mich.

[73] Assignee: Thetford Corporation, Ann Arbor, Mich.

[21] Appl. No.: 823,378

[22] Filed: Jan. 21, 1992

[51] Int. Cl.[5] .................. F16K 31/44; E03D 5/012
[52] U.S. Cl. ........................ 251/229; 4/323; 4/378; 4/434; 137/351; 251/301
[58] Field of Search ............... 4/315, 321, 323, 378, 4/434; 137/351, 899; 251/56, 158, 193, 229, 301

[56] References Cited
U.S. PATENT DOCUMENTS

| | | | |
|---|---|---|---|
| 3,237,916 | 3/1966 | Bryant | 251/158 |
| 3,343,562 | 9/1967 | Combes | 251/158 |
| 4,217,668 | 8/1980 | Sargent et al. | 4/323 |
| 4,439,875 | 4/1984 | Stewart et al. | 4/321 |
| 4,776,631 | 10/1988 | Sargent et al. | 4/321 |
| 4,908,885 | 3/1990 | Antos | 4/321 |
| 4,944,048 | 7/1990 | Sargent et al. | 4/323 |
| 5,020,775 | 6/1991 | Iwasaki et al. | 251/301 |

Primary Examiner—George L. Walton
Attorney, Agent, or Firm—Harness, Dickey & Pierce

[57] ABSTRACT

A mechanism for multiplying rotation. The mechanism includes two armatures of differing lengths which rotate about different centers of rotation. The armatures are coupled together such that a rotation of one armature will produce a multiplied rotation in the other armature. The multiplying mechanism has particular application with a valve assembly of the type used in self-contained sanitary systems of recreational vehicles. The valve assembly includes a seal element having a sealing lip directed toward generally inward and downward of a fill opening a valve blade in the holding tank. The sealing lip terminates in a downwardly and outwardly oriented flange. The valve blade is actuatable through two movements. The first movement moves the valve blade generally vertically into and out of engagement with the seal element. The second movement moves the valve blade generally horizontally to a position out of registry with the fill opening.

13 Claims, 6 Drawing Sheets

PORTABLE WASTE HOLDING TANK WITH IMPROVED INLET VALVE ASSEMBLY

BACKGROUND AND SUMMARY OF THE INVENTION

This invention relates to a mechanism for multiplying rotary movement, and particularly to improvements in a valve assembly for the fill opening of a waste holding tank in the sanitary system of a recreational vehicle (RV).

Removable waste holding tanks adapted for use with toilets are typically positioned within an interior compartment of the RV. Waste is transported by the toilet structure to the holding tank where it is stored. The holding tank can be conveniently removed from the RV through an exterior access door and then transported to a waste disposal sight for emptying.

To enable the holding tank to accept waste products from the toilet of the sanitary system, a waste holding tank of the above mentioned type generally include a centrally disposed fill opening located within its top wall. A seal element surrounds the fill opening of the tank and includes an upper portion which seals against an outlet opening of the toilet bowl. So constructed, waste can be easily and sanitarily transferred into the holding tank.

To prevent the holding tank from leaking waste when it is removed from the RV and transported to the disposal site, it is necessary to provide a mechanism for securely closing the fill opening. Normally, a movable valve blade is mounted within the holding tank and is positioned to close off the fill opening. The valve blade may be actuated by an occupant of the RV to uncover the fill opening and thus enable the transferring of waste into the holding tank. The movable valve blade seals against a lower portion of the seal element thereby containing the waste within the holding tank and preventing odors from being vented into the RV.

An RV sanitary system incorporating the above structures is described within U.S. Pat. No. 4,908,885 and U.S. Pat. No. 4,776,631, both commonly assigned to the Assignee of the present application.

During actuation of the valve assembly, the valve blade is rotated or moved out of registry with the fill opening. The valve blade is coupled to an actuation arm which an operator of the assembly is required to rotate to open the valve assembly. The actual degree or amount of rotation required is determined by the width of the valve blade and the length of the actuation member. Generally, the shorter the length of the actuation member, the larger the required rotation. Because the valve blade most often requires operation in a restricted space, the length of the actuation arm is typically short and the degree of rotation is large.

When the holding tank is removed from the RV for emptying, the seal element and valve blade often become immersed in liquid waste and subjected to hydrostatic pressure. This often results in leakage problems. To prevent leaking, various seal elements for the fill opening have been developed to improve the tank's sealability.

The present invention is particularly directed to an improved inlet valve assembly which is not susceptible to the above leakage problems and which may be fully operated through a comparatively small rotation of the actuation arm.

Generally, the valve assembly includes a seal element and a valve blade which is actuated through two distinct movements. The first movement of the valve blade is substantially vertical and engages and disengages the valve blade with the seal element. The second movement is transverse or generally horizontal and moves the valve blade into and out of registry with the fill opening.

When opening a holding tank provided with the valve assembly of the present invention, the valve blade is first moved substantially vertically downward so as to disengage the seal element. The valve blade is then moved in a generally planar fashion out of registry with the fill opening thereby opening the holding tank. To achieve these two movements, the present invention uses two cooperating armatures which rotate about different centers of rotation. The armatures are coupled together in a novel fashion such that a rotation of one armature will produce a multiplied rotation in the other armature.

The seal element generally includes an annular lip which is oriented downwardly and inwardly of the fill opening and is adapted to engage the valve blade when the blade is in its closed position. The end of this lip is flanged and is doubled back or, in other words, is outwardly and downwardly flared. To ensure effective sealing of the fill opening, the flange of the seal element needs to be substantially vertically engaged by the valve blade. This prevents the flared end from moving out of its doubled back position.

Additional benefits and advantages of the present invention will become apparent to those skilled in the art to which this invention relates from the subsequent description of the preferred embodiment and the appended claims, taken in conjunction with the accompanying drawings.

DETAILED DESCRIPTION OF THE PREFERRED EMBODIMENT

Figure 1:
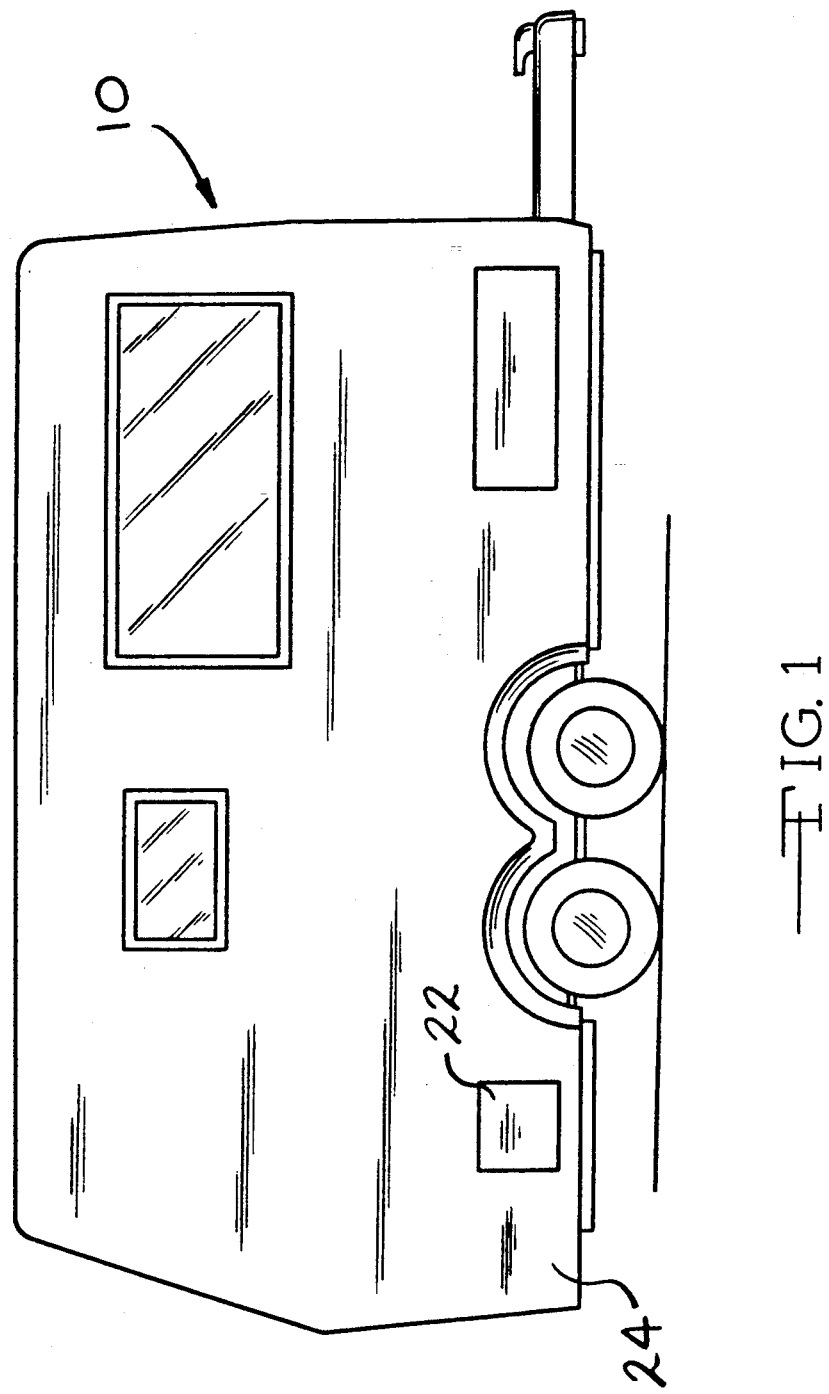
FIG. 1 is a side elevational view of a recreational vehicle of the type to which this invention relates.

Now with reference to the drawing, a recreational vehicle (RV), of the type in which this invention will find application, is illustrated in FIG. 1 and generally designated at 10. While the RV 10 is illustrated as a trailering model, it is readily apparent that the valve assembly of the present invention will also find utility in motorized RVs, portable toilets and nontoilet applications where the multiplied rotational characteristics are desired.

Figure 2:
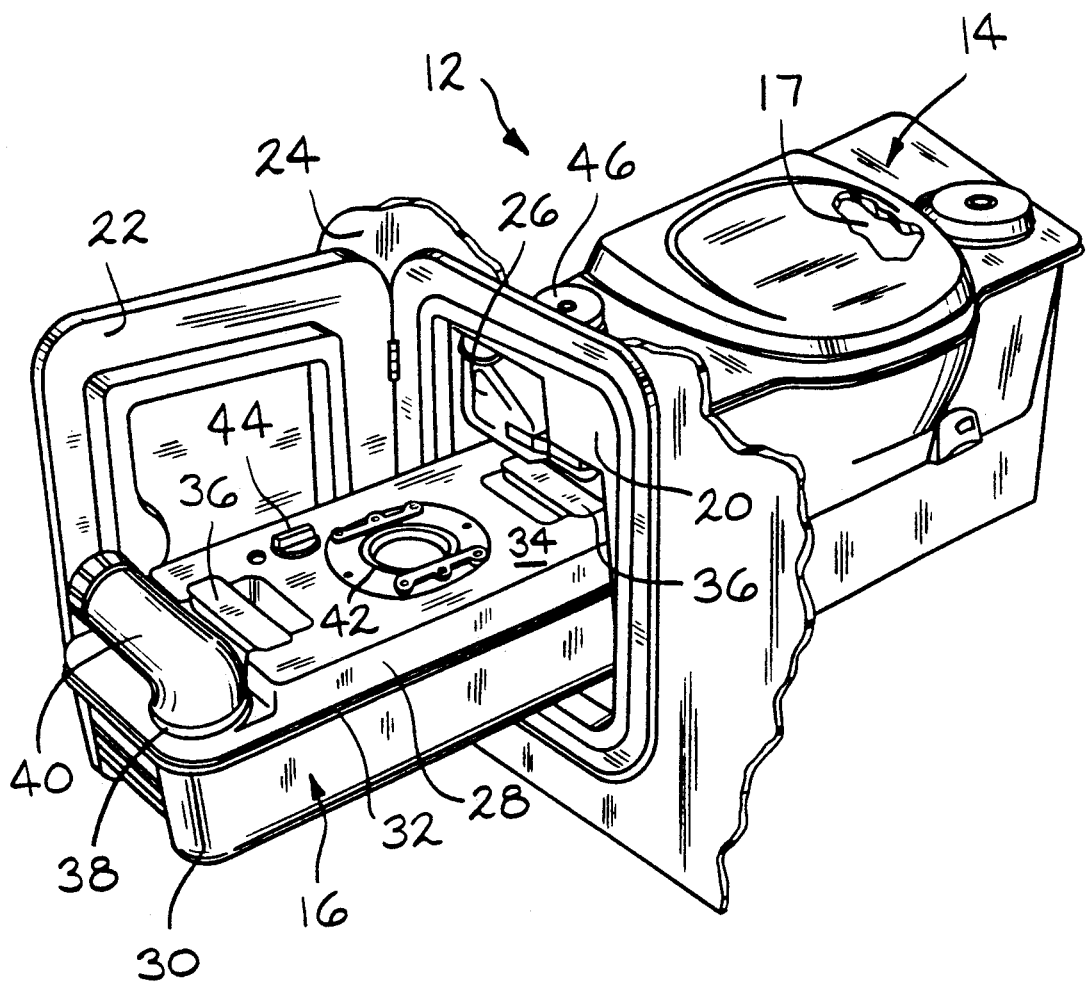
FIG. 2 is a pictorial view of a self-contained cassette-type sanitary system, of the type to which this invention is particularly adapted, being installed in a recreational vehicle.

As seen in FIG. 2, a sanitary system 12 for an RV is provided and generally includes a bench structure 14 and a waste holding tank 16. The bench structure 14 includes a toilet bowl 17 having a bowl outlet opening 18 through which waste is transferred into the waste holding tank 16. The waste holding tank 16 fits into a storage compartment 20 having an access door 22 within an exterior wall 24 of the RV 10. The waste holding tank 16 is adapted to be removably received within the storage compartment 20. FIG. 2 shows the access door 22 opened and the waste holding tank 16 being partially positioned within the storage compartment 20. The removability of the waste holding tank 16 allows for convenient emptying at an appropriate disposal sight without the risk of contaminating the RV interior.

The bench structure 14 may include a fresh water system to be used for flushing the toilet bowl 17. The fresh water system includes a fill container 26 which is positioned within the storage compartment 20 and which may be rotated outwardly, when the access door 22 is opened, to enable convenient filling thereof.

The waste holding tank 16 is constructed from an upper portion 28 and a bottom portion 30 which are joined by continuous bonded seam 32. A top wall 34 of the upper portion 28 is provided with a pair of spaced apart handles 36 that are attached or integrally formed therewith. When not in use, the handles 36 are preferably flush with the top wall 34 to provide the waste holding tank 16 with a more compact construction. Being spaced apart, the handles 36 provide for convenient handling and transporting of the waste holding tank 16 to the appropriate disposal sight for emptying.

One end of the waste holding tank 16 is provided with an opening 38, to which is mounted a drain spout 40. The drain spout 40 is rotatable from the position seen in FIG. 2 to a position which enables convenient emptying of the waste materials from the waste holding tank 16 therethrough.

When the waste holding tank 16 is properly inserted into the storage compartment 20, a fill opening 42, centrally disposed within the top wall 34, is in registry with the bowl outlet opening 18. Thus, the fill opening 42 is the access port through which the waste products flow from the bowl outlet opening 18 into the waste holding tank 16. During insertion of the waste holding tank 16 into the storage compartment 20, an actuator 44 becomes engaged with an operator 46 which allows the valve assembly 50 to be conveniently operated from within the RV 10.

Figure 3:
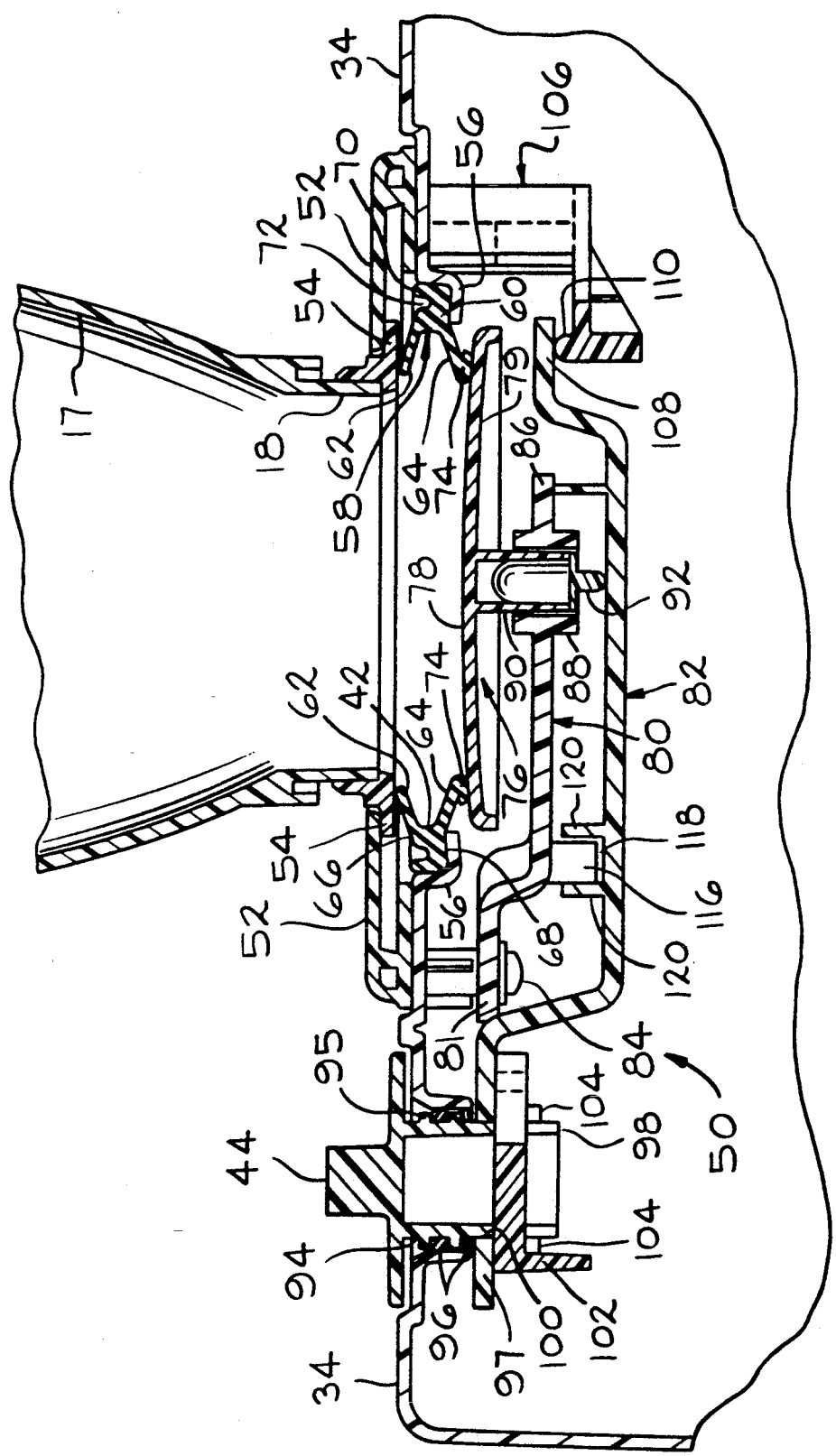
FIG. 3 is a cross sectional view taken substantially along line 3—3 in FIG. 4 illustrating the valve blade in a closed position engaging the seal element.

As seen in FIG. 3, a pair of guide members 52 are provided along opposing sides of the fill opening 42 to engage a radial retention flange 54 which encircles the bowl outlet opening 18. The guide members 52 are elongated in the direction of insertion and withdrawal of the waste holding tank 16 and thereby ensure lateral positioning of the fill opening 42 in registry with the bowl outlet opening 18. The guide members 52 are secured in position on the top wall 34 by fasteners (not shown), such as threaded fasteners or rivets. Insertion of the waste holding tank 16 is limited by the depth of the storage compartment 20. This provides for proper positioning of the fill opening 42 along the insertion axis.

An annular groove 56 encircles the fill opening 42 and provides a seating for a seal element 58. The seal element 58 is disposed within the annular groove 56 so as to encircle the fill opening 42 and is retentively held therein by adhesives, a locking ring or other retaining-type fastener.

The seal element 58 is preferably formed from an elastomeric material and includes a main body portion 60. A pair of radially inwardly directed sealing lips 62 and 64 are provided which respectively extend from an upper face 66 and a lower face 68 of the main body portion 60. Extending generally upward from the outboard portion of the main body 60 is a retention lip 70 which defines a groove 72 encircling the main body portion 60. The groove 72 may be used in conjunction with a retaining member (not shown) to retain the seal element 58 within the annular groove 56 discussed above. The upper sealing lip 62 is designed for engagement around the outlet opening 18 of the toilet bowl 17 when the holding tank 16 is fully inserted and properly positioned within the storage compartment 20. The lower sealing lip 64 is designed to engage a valve blade 76 and terminates in a radially downwardly and outwardly flange or flared end 74, which is more fully described below.

As previously mentioned, when the waste holding tank 16 is removed from the storage compartment 20 and being transported to the disposal sight, it is necessary to prevent waste from leaking through the fill opening 58. Typically, the waste holding tank 16 will be filled with sewage or "black waste" and, accordingly, the integrity of the seal closing the fill opening 42 must be maintained. Tight sealing is particularly important if the waste holding tank 16 is filled near capacity and transported in an orientation with the fill opening 42 being directed other than vertical. In either case, hydrostatic pressure may be applied to the seal element 58 around the fill opening 42. If not compensated, the hydrostatic pressure may cause waste to leak through the fill opening 42 and valve assembly 50.

To prevent waste from leaking through the fill opening 42 under hydrostatic forces, the downwardly and outwardly oriented flared end 74 of the seal element 58 is upwardly engaged by a valve blade 76. Since the engagement is substantially vertical, the flared member 74 is generally compressed and doubled or bent back upon the lower sealing lip 64. Hydrostatic forces within the waste holding tank 16 will now exert a force on the flared end 74 which actually tends to cause the flared end 74 to exert a greater sealing force against the valve blade 76.

To maintain the flared end 74 in its doubled back position against the sealing lip 64, the valve blade 76 engages the flared end 74 in an upward or substantially vertical direction. If the valve blade 76 is in contact with the flared end 74 and "wiped" or moved transversely thereacross during upward engagement, the flared end 74 may invert to a position aligned with the lower sealing lip 64 (i.e. directed inward of the fill opening), thereby losing the benefit of the hydrostatic pressure in increasing the sealing force.

With the above in mind, the valve assembly 50 of the present invention provides for an assembly in which a valve blade 76 undergoes two distinct movements during engagement. The first movement is generally vertical and causes sealing engagement of the valve blade 76, or disengagement depending on the direction of the movement, with the flared end 74. The second movement is performed with the valve blade 76 disengaged from the seal element 58 and is generally an arcuate movement in a substantially horizontal plane. The second movement positions the valve blade 76 out of registry with the fill opening 42 and permits the transfer of waste from the bowl outlet opening 18 into the waste holding tank 16.

The valve blade 76 has a generally circular configuration which corresponds with the size of the fill opening 42. The uppermost surface 78 of the valve blade 76 is slightly domed to facilitate the clearing of waste material therefrom without the need of a wiping action between the valve blade 76 and the seal element 58. Cooperating interaction between a carrier arm 80 and an actuator arm 82 moves the valve blade 76 through its vertical and planar motions.

The carrier arm 80 is engaged at one end 81 to the top wall 34 by a pin 84 so as to be pivotable or rotatable about a vertical axis defined through the pin 84. The opposing or free end 86 of the carrier arm 80 includes a cylindrical portion 88. Centrally disposed and extending from the lower surface 79 of the valve blade is a cylindrical post 90 which is received within the cylindrical portion 88 of the carrier arm 80. The cylindrical post 90 exhibits an outer diameter that is less than the inner diameter of the cylindrical portion 88. Thus, the valve blade 76 is free to vertically move relative to the cylindrical portion 88 and the carrier arm 80. A contact member or protuberance 92, whose purpose is more fully described below, extends from the lowermost portion of the valve blade's cylindrical post 90.

Extending through an opening 94 formed in the top wall 34 of the waste holding tank 16, the actuator 44 is mounted for rotation. The actuator 44 is sealed within the opening 94 by the engagement of integral rings 95 and seals 96 circumferentially therearound. One end 97 of the actuator arm 82 is engaged to the actuator 44 for causing rotation therewith. As seen in FIG. 3, a portion 98 of the actuator 44 extends through an opening 100 defined in an end 97 of the actuator arm 82. A retaining pin 102 is transversely inserted through that portion 98 of the actuator 44 and retains the actuator arm 82 thereon. Interference blocks 104 are provided on opposite sides of the actuator arm 82 so as to interferingly engage the pin 102 when the actuator 44 is rotated thereby inducing the actuator arm 82 to rotate with the actuator 44.

Affixed to the interior surface of the top wall 34 is a track assembly 106 which guides and supports the free end 108 of the actuator arm 82 during its rotation. As such, the track assembly 106 is generally arcuate and includes a rail member 110 which will support the free end 108 of the actuator arm 102 through its full range of movement. The track assembly 106 may be affixed to the interior surfaces of the top wall 34 by threaded fasteners 112, or the like, extended through legs 114 which position the rail member 110 a predetermined distance below the top wall 34.

FIGS. 3 through 9 illustrate the valve assembly 50 being worked through its two movements. Beginning with the valve assembly 50 in a closed position, by rotating the actuator 44, the actuator arm 82 is caused to rotate in a clockwise direction (when viewed from below) by the engagement of the retaining pin 102 and the interference blocks 104. Also during rotation, a follower or pin 116, extending downwardly from the carrier arm 80, moves within a guide or channel 118 defined by substantially parallel guide rails 120. The pin 116 and channel 118 are more fully described below.

Figure 4:
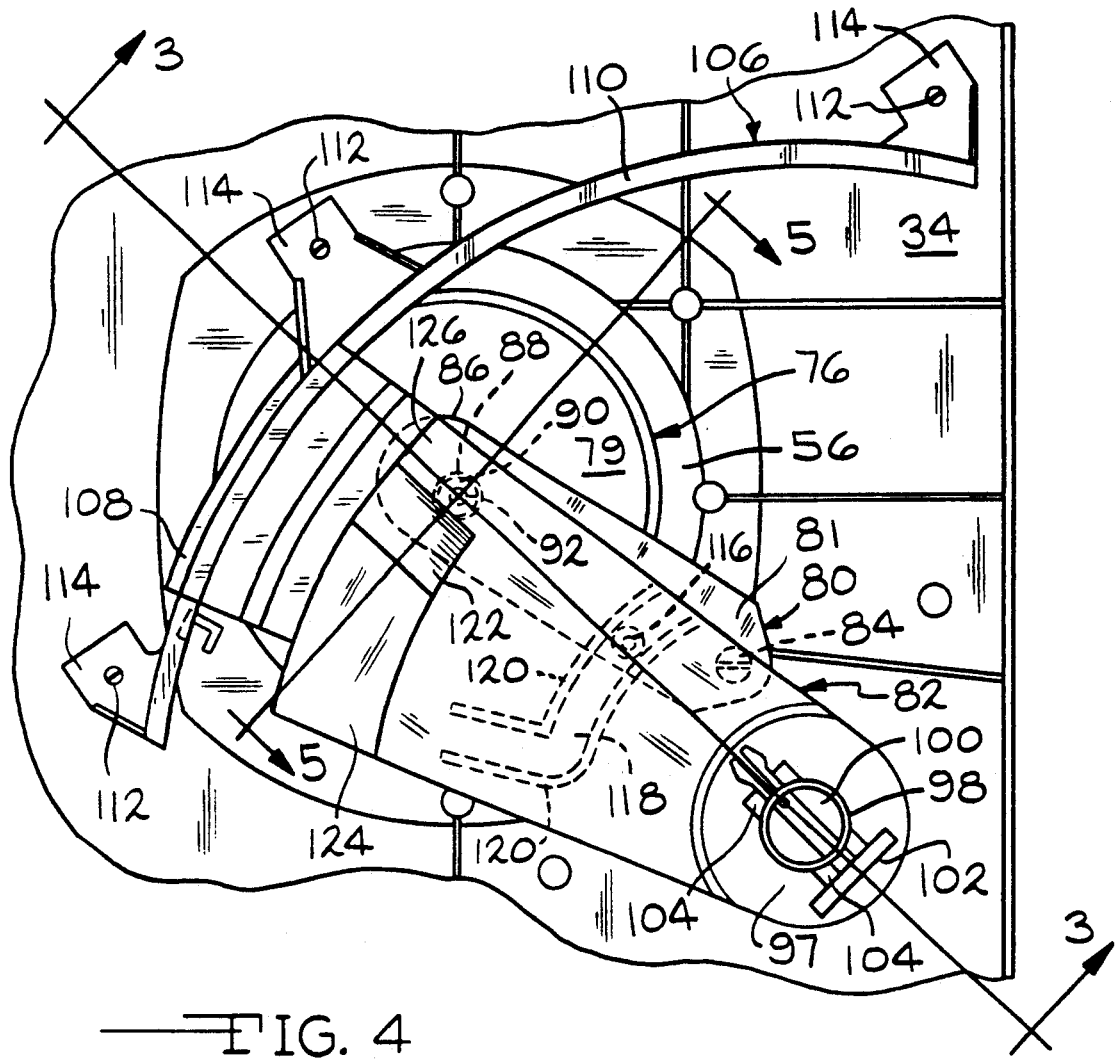
FIG. 4 is a bottom view of the inside surface of a portion of the top wall of the holding tank, particularly showing the valve blade in the closed position illustrated in FIG. 3.
Figure 5:
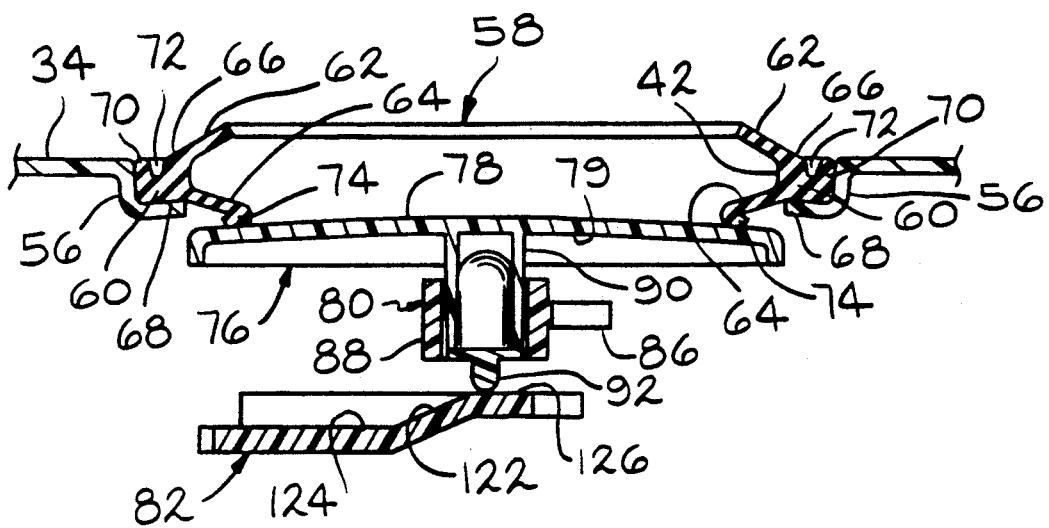
FIG. 5 is a sectional view taken substantially along line 5—5 in FIG. 4 illustrating the valve blade in engagement with the seal element and the means for providing upward movement of the valve blade.
Figure 6:
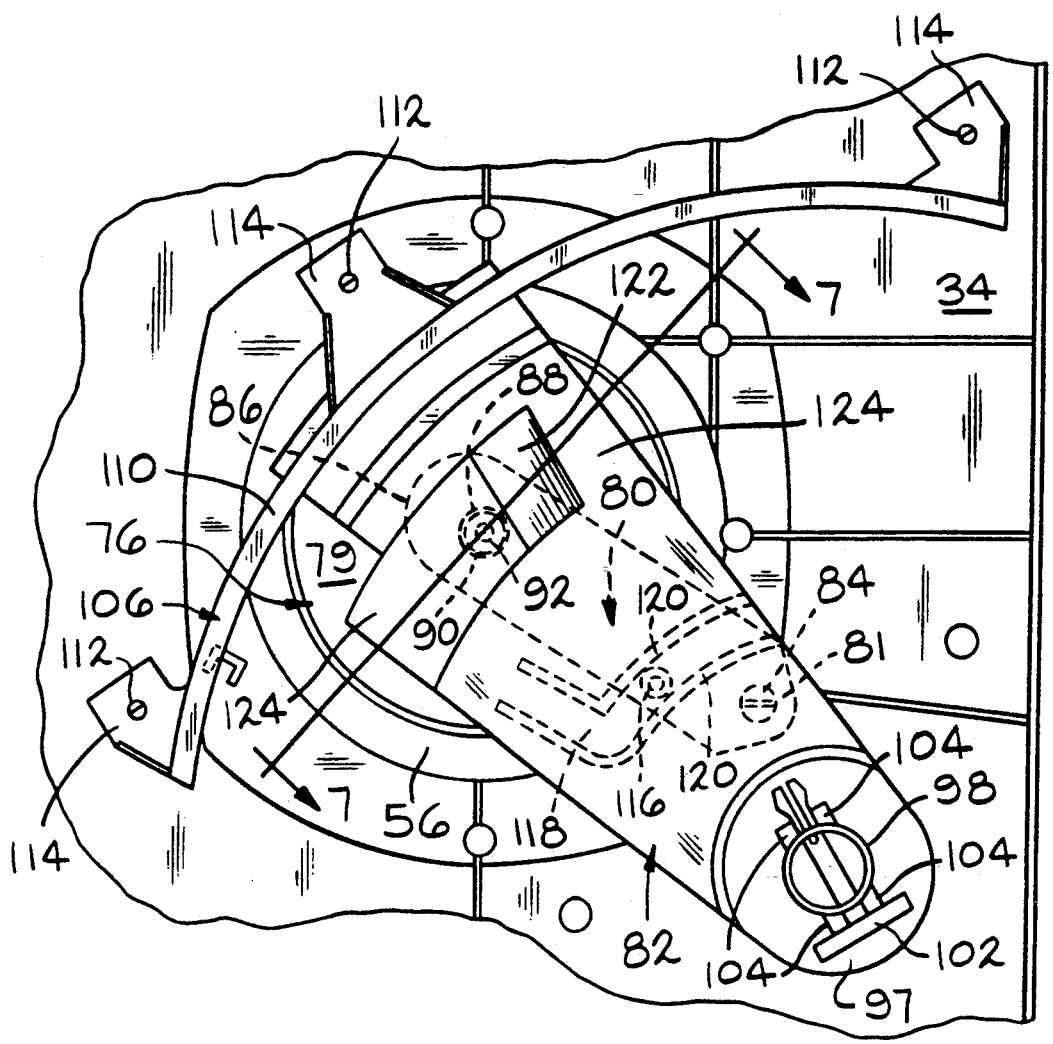
FIG. 6 is a bottom view of a portion of the top wall of the holding tank illustrating the valve blade after downward movement so as to disengage the seal element.
Figure 7:
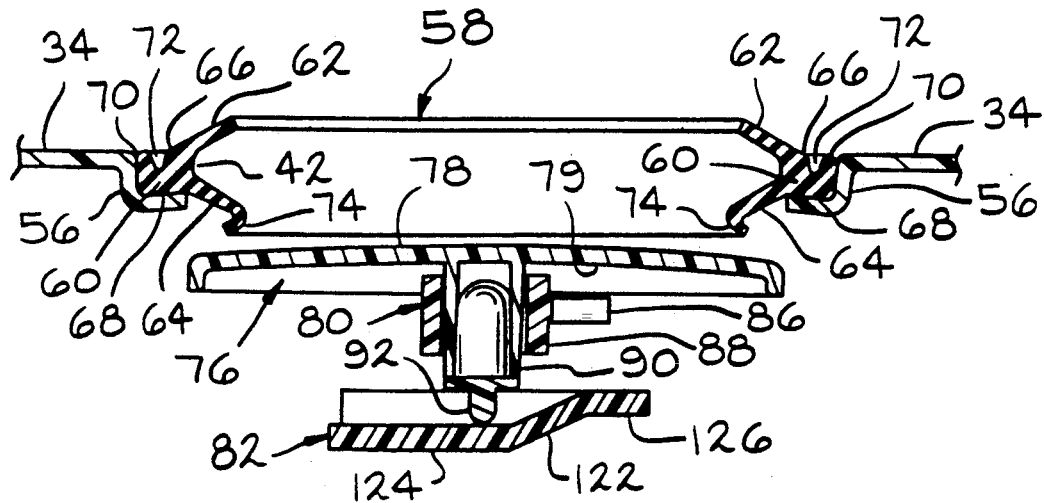
FIG. 7 is a sectional view taken substantially along line 7—7 in FIG. 6 illustrating the valve blade after downward movement and disengagement from the seal element.
Figure 8:
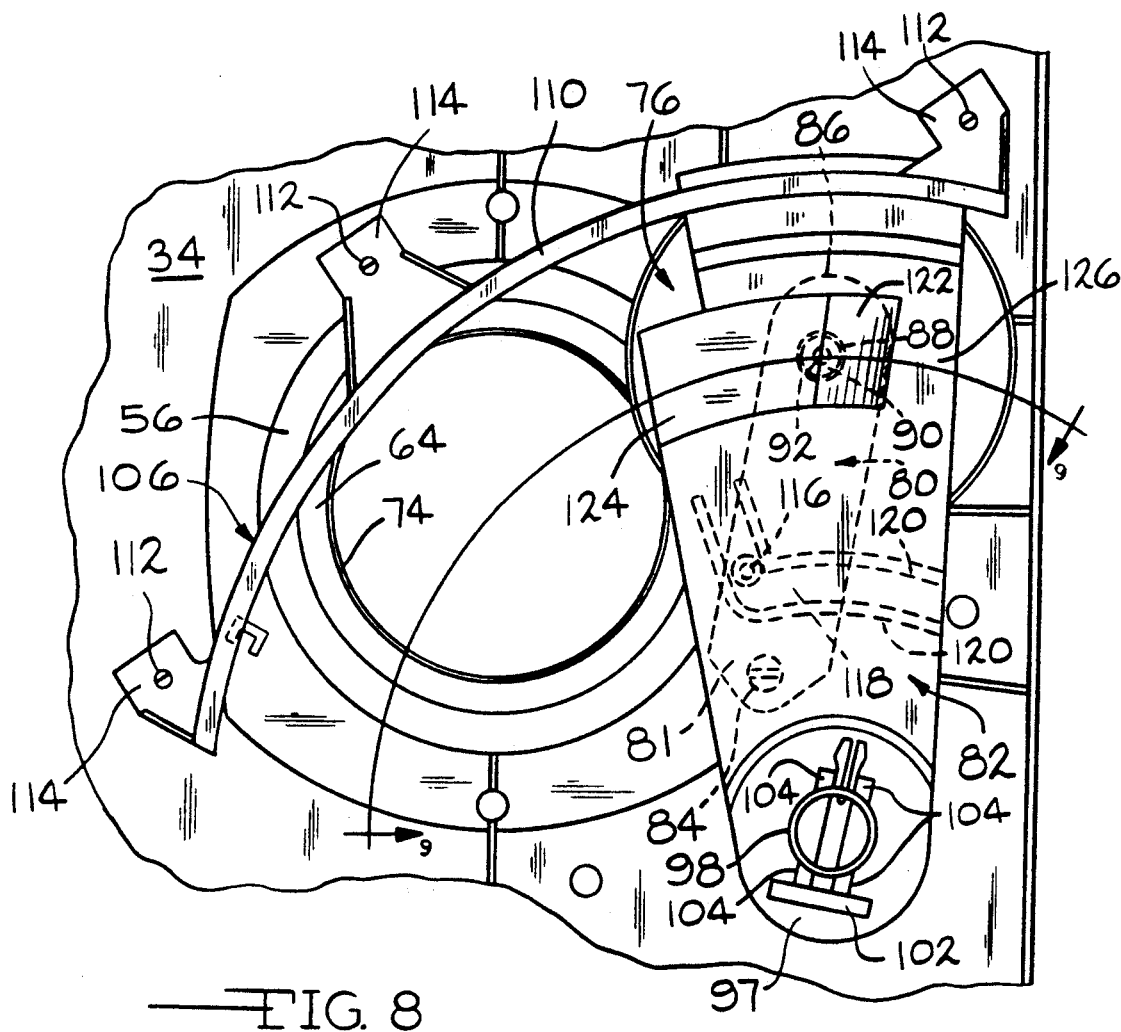
FIG. 8 is a bottom view of a portion of the top wall of the holding tank after movement of the valve blade so as to open the fill opening.
Figure 9:
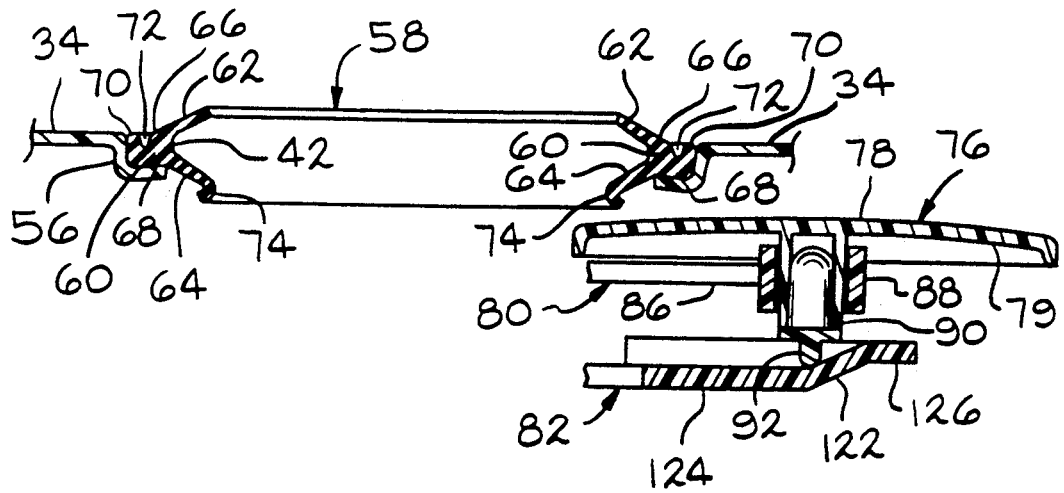
FIG. 9 is a cross sectional view taken substantially along line 9—9 in FIG. 8 illustrating the valve blade after movement to substantially open the fill opening.

As the actuator arm 82 is further rotated, the protuberance 92 of the valve blade 76 encounters a downwardly ramped surface 122 formed in the actuator arm 82 (see FIGS. 4 and 5). Because the cylindrical post 90 is vertically movable with respect to the cylindrical portion 88 of the carrier arm 80, the valve blade 76 is lowered, under the force of gravity, as the protuberance 92 moves down along the ramped surface 122 and the valve blade 76 disengages the flared end 74 of the seal element 58.

Initially, while the actuator arm 82 is rotated clockwise, the carrier arm 80 experiences no rotational movement because the pin 116 travels freely through a first portion of the guide rails 120 and does not engage a reactionary surface of the guide rails 120. Once the protuberance 92 has completely moved down the ramped portion 122 and has reached a lower land or disengagement surface 124 of the actuator arm 82, the pin 116 encounters a second or contact portion of the guide rails 120 which forms a bend in the channel 118. The second portion of the guide rails 120 is angularly oriented with respect to th first portion. Contacting engagement of the pin 116 with the bend in the channel 118 induces the carrier arm 80 to begin rotary movement in a clockwise direction (see FIGS. 6 through 9) which continues until the valve blade 76 is positioned in a substantially nonobstructing relationship with the fill opening 42. Since the pin 116 continues to move along the second portion of the guide rails 120, longitudinally relative to the actuator arm 82, the shorter length and different center of rotation cause the carrier arm 80 to rotate faster than the actuator arm 82.

To close the valve assembly 50, the steps recited above are reversed. The valve blade 76 is moved in a generally counterclockwise direction until in registry beneath the fill opening 42 and the bowl outlet opening 18. The protuberance 92 is then forced up the ramped surface portion 122 and onto an upper land 126 or engagement surface. With the protuberance 92 positioned on the upper land 126, the valve blade 76 is forcibly vertically engaged with the flared end 74 of the seal element 58 thereby sealing the fill opening 42.

As seen from the above discussion, the actuator arm 82 and the carrier arm 80 each rotate about different centers of rotation (respectively being defined by the actuator 44 and the pin 84). As mentioned above, the actuator arm 82 and the carrier arm 80 have different lengths, with the actuator arm 82 having the greater length. This unique and novel coupling of two armatures having differing lengths for movement about two centers of rotation is advantageous in that it multiplies the rotation experienced by the valve blade 76. The multiplied rotation allows the valve blade 76 to be disengaged and rotated out of registry with the fill opening 42 with only a small amount or degree of corresponding rotation by the actuator 44. By incorporating two centers of rotation, the valve assembly 50 can be more readily utilized in confined spaces, e.g., a narrower holding tank, than previous designs since movement of the valve blade 76 does not specifically follow the movement of the actuator arm 82.

According to the present invention, the improved valve assembly 50 is also advantageous in that it provides for a positive seal that eliminates the leaking of waste from the waste holding tank 16 through the fill opening 42. Furthermore, the valve assembly 50 is of a simple construction, reduced weight, and lower cost, all of which are desirable from a manufacturing standpoint. While the multiplying mechanism has been specifically described for use with valve assemblies of a self-contained sanitary system, it is contemplated the multiplying mechanism will have utility in other applications which require a large amount of rotary movement within a confined area. As such, the multiplying mechanism of this invention should not be read as being limited to a self-contained sanitary system.

While the above description constitutes the preferred embodiment of the present invention, it will be appreciated that the invention is susceptible to modification, variation and change without departing from the proper scope and fair meaning of the accompanying claims.

We claim:

1. In a holding tank for liquid having a fill opening and a valve assembly for sealing said fill opening, said valve assembly comprising:

a seal element on said holding tank extending circumferentially around said fill opening;

a valve blade engageable with said seal element to form a liquid tight seal and close said fill opening;

a first arm having a free end and a pinned end, said pinned end of said first arm including portions defining a first axis extending therethrough, said first arm being rotatable about said first axis so that said free end thereof traces a generally arcuate first path;

a second arm having a pinned end and a free end, said valve blade being supported by said free end of said second arm for movement therewith, a second axis extending through said pinned end of said second arm, said second axis being different from said first axis and said second arm being rotatable about said second axis to move said valve blade along a generally arcuate path;

coupling means for coupling said first arm to said second arm such that rotation of said first arm induces relative rotation of said second arm in an amount different from said first arm and thereby moving said valve blade; and valve actuation means for actuating said blade substantially vertically into and out of engagement with said seal element in response to rotation of said first arm relative to said second arm.

2. A valve assembly as set forth in claim 1 wherein said coupling means induces rotation of said second arm in an amount greater than an amount of rotation of said first arm.

3. A valve assembly as set forth in claim 1 wherein said first arm is of a first length and said second arm is of a second length, said first length being different from said second length.

4. A valve assembly as set forth in claim 3 wherein said first length is greater than said second length.

5. A valve assembly as set forth in claim 1 wherein said coupling means includes a guide portion formed on said first arm and a follower formed on said second arm, said follower cooperatively engaging said guide portion during rotation of said first arm to thereby cause rotation of said second arm.

6. A valve assembly as set forth in claim 5 wherein said guide portion includes a pair of spaced apart rails having reactionary surfaces.

7. A valve assembly as set forth in claim 6 wherein said follower is positioned between said pair of rails for relative movement therebetween.

8. A valve assembly as set forth in claim 7 wherein said guide portion includes a contact portion, said contact portion being angularly oriented to contact said follower and induce rotation of said second arm in response thereto.

9. A valve assembly as set forth in claim 8 wherein said contact portion is substantially straight.

10. A valve assembly as set forth in claim 1 wherein said valve actuation means includes a ramp formed on said first arm, said ramp being located on said first arm to cooperatively engage a portion of said valve blade during rotation of said first arm and substantially vertically move said valve blade relative to said seal element as said portion of said valve blade engages said ramp.

11. A valve assembly as set forth in claim 10 wherein said portion of said valve blade is in slidable contacting engagement with said ramp.

12. A valve assembly for a self-contained sanitary system of the type including a bench structure having a waste receptacle with a downwardly directed outlet opening and a storage compartment defined and located below said outlet opening, a waste holding tank removably disposed within said storage compartment, said tank having a fill opening positioned in registry with said outlet opening when said tank is inserted within said storage compartment, said valve assembly being operable to close said fill opening and to seal said tank thereby preventing the leakage of waste from said tank through said fill opening, said valve assembly comprising:

a seal element mounted circumferentially around said fill opening and including a body having an annular sealing lip extending interiorly of said tank;

a valve blade circumferentially engageable with said seal element to form a fluid tight seal thereby closing said fill opening of said holding tank; and means for actuating said valve blade along first and second movements in response to rotary movement, said first movement being generally along a vertical axis to move said valve blade between a position engaged with said seal element and a position disengaged from said seal element, said second movement being substantially transverse to said first movement to move said valve blade between a position in registry with said fill opening and a position substantially nonobstructing of said fill opening, said actuating means including a first arm mounted for rotation about a first axis defined through one end of said first arm, said actuating means also including a second arm mounted for rotation about a second axis defined through one end of said second arm and being different from said first axis, said valve blade being mounted to said second arm for substantially vertical movement with respect thereto and said first arm contacting a portion of said valve blade during rotation of said first arm so as to cause said first movement of said valve blade, a follower formed on said second arm and a guide portion formed on said first arm, said follower extending from said second arm so as to contact said guide portion during rotation of said first arm and induce rotation of said second arm in response to rotation of said first arm thereby causing said second movement of said valve blade.

13. A valve assembly as set forth in claim 12 wherein said first arm includes an upper surface, a lower surface, and a ramped surface extending therebetween, said portion of said valve blade being in slidable contact with said first arm so as to engage said ramp surface between said upper surface and said lower surface during rotation of said first arm thereby causing said valve blade to move along said first movement.

* * * * *